United States Patent [19]

Leisure

[11] 4,040,901
[45] Aug. 9, 1977

[54] MOUNTING FOR SECTIONAL SCREEN
[75] Inventor: Everett R. Leisure, Portland, Oreg.
[73] Assignee: Esco Corporation, Portland, Oreg.
[21] Appl. No.: 714,517
[22] Filed: Aug. 16, 1976
[51] Int. Cl.² .......................... D21C 7/00; B01D 25/02
[52] U.S. Cl. ................................ 162/251; 210/323 R
[58] Field of Search ...................... 162/251; 210/323 R
[56]  References Cited
  U.S. PATENT DOCUMENTS

| 2,062,127 | 11/1936 | Guettler et al. | 162/251 |
| 2,163,437 | 6/1939 | Richmond | 162/251 |
| 2,340,925 | 2/1944 | Boyer | 162/251 |
| 2,634,209 | 4/1953 | Nevin | 162/251 |
| 2,852,369 | 9/1958 | Eyolfson | 162/251 |

Primary Examiner—S. Leon Bashore
Assistant Examiner—Richard V. Fisher
Attorney, Agent, or Firm—Tilton, Fallon, Lungmus, Chestnut & Hill

[57]  ABSTRACT

A strainer construction including a generally rectangular screen section for the interior of a walled vessel equipped with unique hook receiving means for supporting the same and facilitating expansion of the number of screen sections.

7 Claims, 12 Drawing Figures

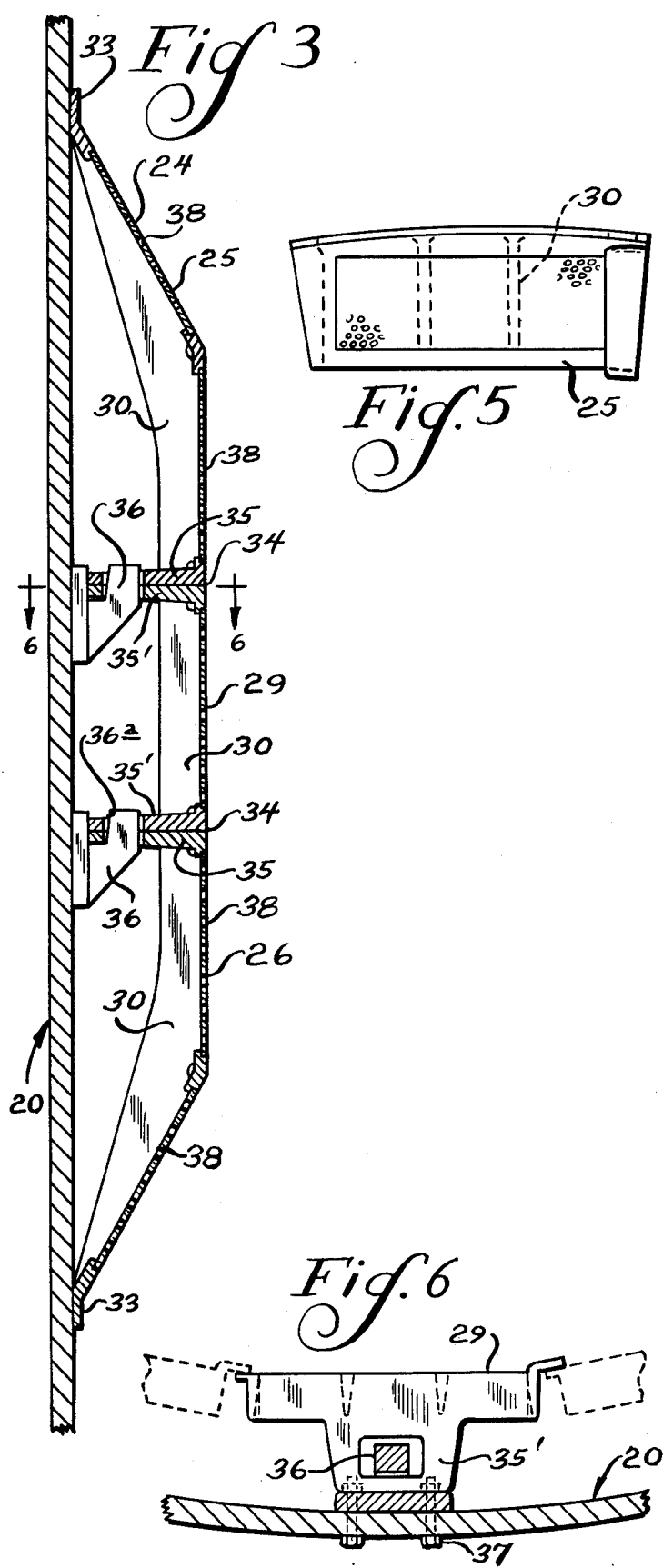

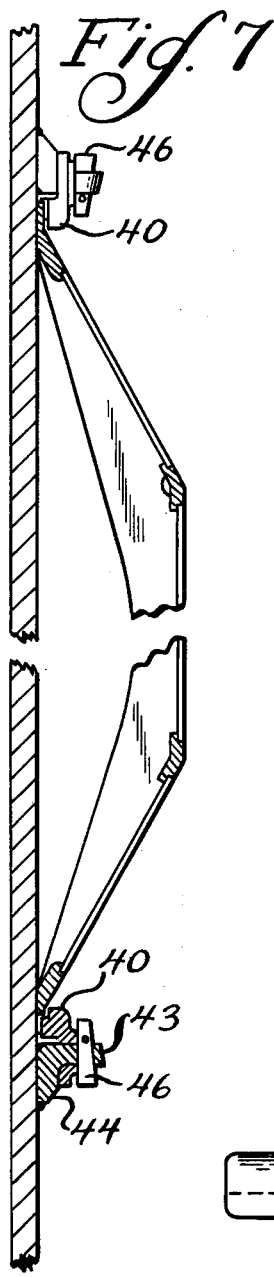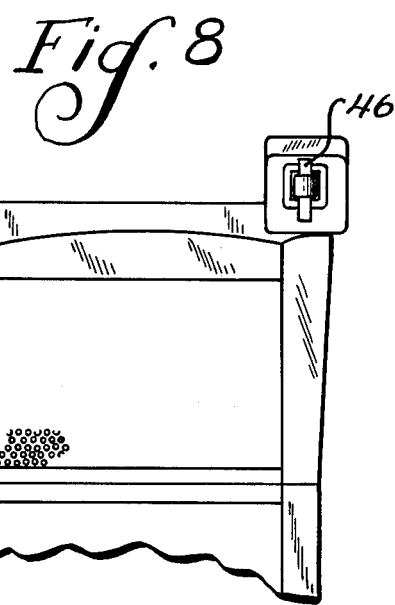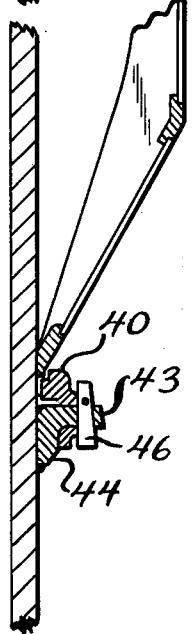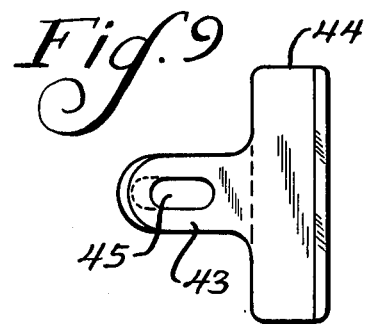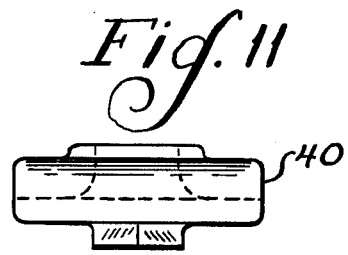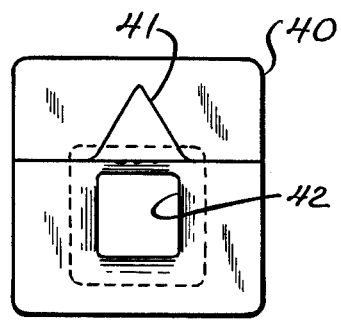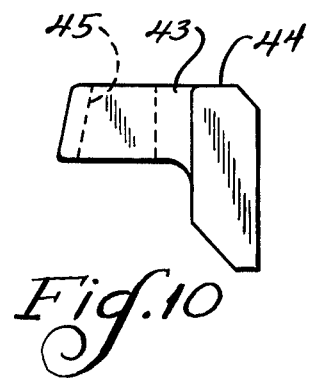

MOUNTING FOR SECTIONAL SCREEN

BACKGROUND AND SUMMARY OF INVENTION

This invention is an improvement on co-owned U.S. Pat. No. 2,852,369 entitled "Digester Strainer".

Strainers of this type may be used in a wide variety of tanks or vessels regardless of shape (cylindrical, spherical, conical, or flat-sided) and regardless of size or internal pressure in the vessel. The purpose of the strainers is to permit the extraction of liquids or liquid-gas mixtures from the liquid-solid contents of the vessel. For example, the invention has proved particularly valuable to the pulp and paper industries, wherein strainers of this type have been widely used to withdraw process liquors from pulp digesters containing liquors, cellulosic materials and pulp fibers.

This invention constitutes an improvement on the above identified patent so as to expand the usefulness of the previously patented strainers while retaining the proven effectiveness of the "lap-joint" between adjacent strainer sections described and shown in the above-identified patent.

Modern process industries, including the pulp and paper industry, have continued to increase the size of vessels and other components used in their process systems. Frequently, there is a relationship between the amount of liquid to be extracted through the strainers and the total contents of a process vessel, so that larger vessels require more strainer capacity. Under the above patent, strainer capacity could be increased only by enlarging the size of the individual strainer sections, which was undesirable from the standpoint of installation and maintenance, or by installing additional strainers at another location inside the process vessel. The latter alternative is not possible in all cases, since there may be definite relationships between the location of the strainers and the effectiveness of the process.

The instant invention provides a unique type of mounting for strainer screens which, in addition to being reliable and effective, also provides a means for enlarging the open area of strainer screens to whatever degree may be required for a given process, while maintaining the individual sections of the strainers at a size and weight that can be handled easily for its installation, maintenance or replacement — and at the same time, retaining the "lap-joint" feature to cover the major joints between adjacent sections.

Under the invention, the upper and lower sections of the strainers may be identical, thus reducing the number of spare parts which must be retained. The open area of the strainer screens may be increased to any desired extent by the use of additional center sections which may be mounted on the same type of supports as used for the top and bottom sections. A unique type of center mounted support hook permits the strainers in the low row to be hung easily during installation and the wedge shape design of this hook relieves the bottom support blocks from the full weight of the strainers. The support blocks also hold the upper strainer sections in place until the top support blocks can be fastened.

DETAILED DESCRIPTION

The invention is described in conjunction with an illustrative embodiment in the accompanying drawing, in which FIG. 1 is a fragmentary elevational view of a digester or like vessel with a portion broken away to illustrate the digester screen;

FIG. 3 is a vertical sectional view of a screen arrangement such as seen in FIG. 2;

FIG. 4 is a front elevational view of the screen arrangement seen in FIG. 3;

FIG. 5 is a top plan view of the screen arrangement of FIGS. 3 and 4;

FIG. 6 is a fragmentary sectional view taken along the line 6—6 of FIG. 3;

FIG. 7 is a fragmentary vertical sectional view essentially similar to FIG. 3 but additionally showing details of the top and bottom mounting supports for the screen sections;

FIG. 8 is a front elevational view in fragmentary form showing the additional supports;

FIG. 9 is a plan view of the mounting block portion of the additional mounting means illustrated in FIGS. 7 and 8;

FIG. 10 is a side elevational view of the block portion of FIG. 9;

FIG. 11 is a top plan view of the cap portion of the additional supporting means which cooperates with the block portion of FIGS. 9 and 10; and FIG. 12 is a front elevational view of the aforesaid cap portion of FIG. 11.

Figure 1:
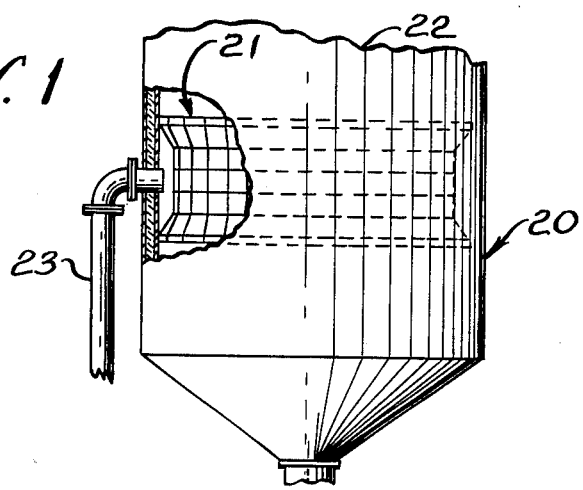

In the illustration given, and with reference first to FIG. 1, the numeral 20 designates generally a walled vessel, a portion of which is broken away to indicate a section-type screen designated generally by the numeral 21. The mixture to be screened may be delivered into the top 22 while the exit pipe for the strained material is designated 23.

Figure 2:
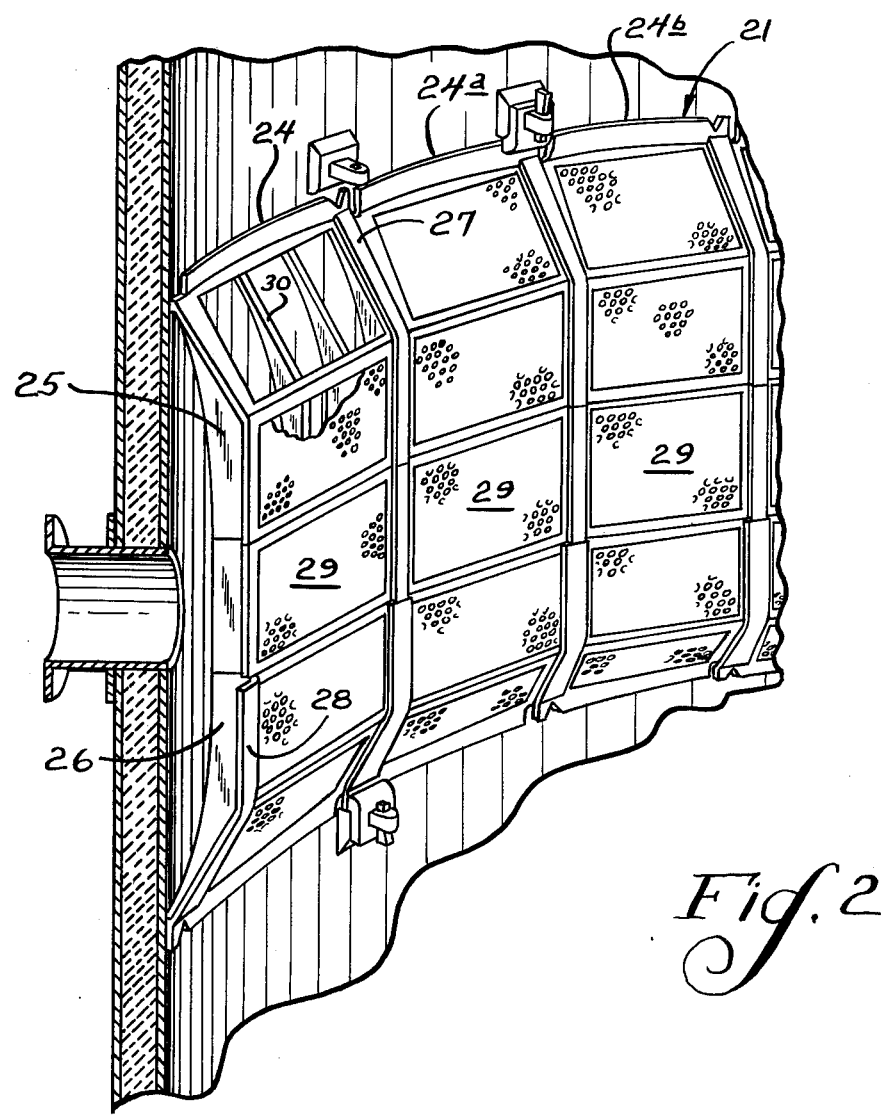
FIG. 2 is a fragmentary perspective view of a portion of the vessel and screen of FIG. 1.

The screen 21 can be seen in greater detail in FIG. 2 wherein a series of identical groups of strainers are shown and designated 24, 24a and 24b. Each group (taking the group 24 as illustrative) has at least an upper section 25 and a lower section 26. As indicated previously, the sections 25 and 26 may be identical as can be appreciated from a consideration of FIG. 4. In FIG. 4, the upper section 25 is equipped along its right side with the lap joint or flange 27 characteristic of the earlier patent. In similar fashion, the lower section 26 has the lap joint or flange 28 disposed along its left side.

Returning to FIG. 2, the lap joint 28 is designated in the lower left hand corner and will be seen that relative to the groups 24a and 24b that similar lap joints are provided along the left hand side of the lower section. The lap joints 27 of the upper sections are illustrated as overlapping in analogous fashion, i.e., the lap joint 27 of the group of screen sections 24 overlaps the left hand edge of the upper section of the group 24a.

Still referring to FIG. 2, it will be noted that each of the groups 24, 24a and 24b is equipped with a center section as at 29.

From the showing in the upper left hand portion of FIG. 2, it will be seen that the section 25 is equipped with a plurality of vertically extending ribs as at 30 which also can be appreciated from a consideration of FIGS. 3-5 wherein each of the sections 25, 26 and 29 are equipped with vertically extending ribs 30.

Each of the sections 25 and 26 is generally rectangular in front elevation to provide thereby a pair of vertical edges 31 and 32 (see FIG. 4). The edges can be considered to be provided by additional vertically extending ribs much like the previously referred to ribs 30. In addition to providing the vertical edges 31 and 32, each of the generally rectangular sections 25 and 26 provides a pair of horizontal edges as at 33 and 34. As can be appreciated from a consideration of FIG. 3, the vertical edges and hence, the ribs 30 are generally arcuate in side elevation so as to position one horizontal edge 33 of each section 25 and 26 adjacent the vessel wall and the other horizontal edge 34 a spaced distance from the wall 20.

For the purpose of mounting the various sections, each section is equipped with hook-receiving means on the generally rectangular frame defining the section, the hook receiving means being designated 35 and (with reference to FIG. 3) being seen to be adjacent the horizontal edge which is spaced from the wall 20. As can be further appreciated from a consideration of FIG. 6, the intermediate section 29 is also equipped with hook receiving means 35' which cooperate with the hook receiving means 35 of the upper and lower sections 25 and 26 respectively in order to support the various sections from hooks 36 provided on the wall of the vessel 20.

Advantageously, each hook 36 may be bolted as at 37 (see FIG. 6) to the wall of the vessel 20. I have also found it advantageous to taper the hook 36 upwardly as can be appreciated from the showing designated 36a relative to the lower hook in FIG. 3. An installation can be arranged initially for either screen contraction or expansion by virtue of installing the requisite number of hooks 36. For example, relative to FIG. 3, if it is desired to remove the center section 29, the upper section 25 is removed first after which the section 29 is removed and thereafter the upper section 25 supported on the lower hook 36. In similar fashion, an additional center section (not shown) can be installed merely by the addition of an additional hook 36 above the upper hook 36 which, in turn, will support the upper section 25.

As indicated, previously, it is considered preferable to provide the upper and lower sections 25 and 26 of the same construction so as to minimize the number of spares that have to be maintained in inventory. Thus, the lap-joint on the lower sections extends a different direction from that on the upper section. Relative to the center sections, the lap-joint flange can go in either direction, matching either the top or bottom. In the illustration given in FIG. 4, the flange of the lap-joint for the center section 29 is on the left side as at 37. There is no real requirement for a flange to cover the horizontal joint between the center section and the upper or lower sections, as the case may be because this is only a narrow gap and does not require the accommodation that the vertical joint requires for vessels of varying diameters.

As can be best appreciated from a consideration of FIG. 6, the hook receiving means 35' is located midway of the section and, by reference to FIG. 3, it will be noted that the flanges providing the hook mounting means 35 are tapered in proceeding toward the wall of the vessel 20. More particularly, each section includes a frame made up of vertical members such as the ribs 30, 31 and 32 and horizontal members as at 33 and 34. The horizontal members 34 (positioned downwardly for the upper section 25 and upwardly for the lower section 26) are relatively wide plate members integrated with the vertical members 30-32 to provide a rigid support for the screens 38.

Illustrated on the third drawing sheet is an additional mounting means which has been found advantageous for use in place of the Z-bars or welding referred to in the earlier patent. First, however, by reference to FIG. 4, it will be noted that the horizontal edge 33 (upwardly positioned relative to the upper sections 25 and downwardly positioned relative to the lower section 26) is equipped with a V-notch as at 39. This V-notch 39 provides an advantageous means for mounting a cap member 40 — compare the lower portion of FIG. 7 with FIG. 12. In FIG. 12, the cap member 40 is seen to include a triangular shaped boss 41 which adapts the cap member 40 for ready installation within the notch 39. Additionally, the cap member 40 is equipped with an aperture 42 which is adapted to receive the lug or projection 43 of the block member 44. The block member 44, in the lug portion 43, is equipped with a tapered aperture 45 which is adapted to receive a wedge 46 (see FIG. 7).

As pointed out previously, the hooks 36 permit the sections 26 to be hung thereon during installation until the cap and block members 40 and 44 or other attaching means such as Z-bars can be assembled. The same applies to the upper sections wherein the support hooks hold the upper sections 25 in place until the top cap and block members can be fastened.

First, the various supporting components are accurately located and attached inside the digester vessel, with respect to proper location inside the vessel, proper relationship to outlet nozzles through the vessel wall and the pre-determined number of supporting components required for the particular strainer installation. The supporting components include the center hooks and either the cap and block members or Z-bars at the top and bottom of the strainer row. Secondly, the strainer sections are hung in place. The lower strainer section is hung first, on its appropriate center hook, and the bottom supports (either the bottom caps or Z-bars) are attached loosely to provide stability to the bottom strainer section while the center strainer sections and the top strainer section are mounted on their appropriate center hooks. The top supports, either caps or Z-bars, are then attached, and both top and bottom supports are tightened to a reasonably snug fit. Adjacent strainer sections are then mounted in place, adjusting the lap-joint against the first strainer. It may be necessary to loosen the top and bottom support members for proper lap-joint adjustment, then re-tighten. Thirdly, the installation is completed and all support fasteners tightened completely. For a 360 degree strainer ring, the last strainer sections must be properly fitted to the first strainer sections installed; for a partial strainer ring, the outboard strainer sections at the end of the partial ring must have their end openings closed by welded-in closure plates. The wedges used to tighten the support caps on the support blocks may be tack-welded or wired in place for security during future operation.

While in the foregoing specification a detailed description of an embodiment of the invention has been set down for the purpose of illustration, many variations in the details hereingiven may be made by those skilled in the art without departing from the spirit and scope of the invention.

I claim:

1. In combination with the interior wall of a vessel, a sectional screen mounted thereon, each section comprising a frame which is generally rectangular in front elevation to provide a pair of vertical edges and first and second horizontal edges, said vertical edges being generally arcuate in side elevation to position said first horizontal edge adjacent the vessel wall and said second horizontal edge spaced from said wall, and hook receiving means on said frame adjacent said second horizontal edge and extending toward said wall for supporting and stabilizing said section in place, said sections being arranged in a plurality of pairs, the sections in each pair being vertically related to position said first horizontal edge of the lower section downwardly and said first horizontal edge of the upper section upwardly, said second horizontal edges of each pair being in abutting relation to position the hook receiving means of each section of each pair in abutting, aligned relation, and a single hook means on said wall engaging said hook receiving means and passing through the openings in the aligned hook-receiving means of each pair.

2. The structure of claim 1 in which each hook means includes an upwardly extending, upwardly tapered part received within the hook receiving means of each section associated therewith.

3. The structure of claim 1 in which said hook-receiving means is located midway of the length of each second horizontal edge.

4. The structure of claim 3 in which said frame includes a plurality of spaced apart vertically extending ribs, said second horizontal edge including a plate member integrated with said ribs and having an integral flange to provide said hook-receiving means, and means defining a vertically extending opening in said flange.

5. The structure of claim 4 in which said flange is tapered in proceeding toward said wall.

6. The structure of claim 1 in which each of said first horizontal edges is equipped with an apertured cap member adjacent one vertical edge, said wall being equipped with a block member having a lug received in the aperture of its associated cap member for additionally supporting said section.

7. In combination with the interior wall of a vessel, a sectional screen mounted thereon, each section comprising a frame which is generally rectangular in front elevation to provide a pair of vertical edges and first and second horizontal edges, said vertical edges being generally arcuate in side elevation to position said first horizontal edge adjacent the vessel wall and said second horizontal edge spaced from said wall, and hook receiving means on said frame adjacent said second horizontal edge and extending toward said wall for supporting and stabilizing said section in place, and hook means on said wall engaging said hook-receiving means, said sections being arranged in a plurality of pairs, the sections in each pair being vertically related to position said first horizontal edge of the lower section downwardly and said first horizontal edge of the upper section upwardly, a center section being interposed between said upper and lower sections of each pair, said center section including a generally rectangular frame providing a pair of vertical edges and a pair of horizontal edges, each horizontal edge of said center section frame having hook receiving means alignable with the hook-receiving means of the adjacent section whereby said center section and an adjacent section are mountable on a common hook, said common hook constituting said hook means.

* * * * *